(12) United States Patent
Song et al.

(10) Patent No.: US 10,529,050 B2
(45) Date of Patent: Jan. 7, 2020

(54) METHOD AND APPARATUS FOR PROCESSING WIDE ANGLE IMAGE

(71) Applicant: Hanwha Techwin Co., Ltd., Seongnam-si (KR)

(72) Inventors: Chang Hee Song, Changwon-si (KR); Kyoung Jeon Jeong, Changwon-si (KR); Dae Hwan Kim, Changwon-si (KR)

(73) Assignee: HANWHA TECHWIN CO., LTD, Changwon-si (KR)

( * ) Notice: Subject to any disclaimer, the term of this patent is extended or adjusted under 35 U.S.C. 154(b) by 423 days.

(21) Appl. No.: 15/427,530

(22) Filed: Feb. 8, 2017

(65) Prior Publication Data

US 2018/0089795 A1 Mar. 29, 2018

(30) Foreign Application Priority Data

Sep. 27, 2016 (KR) .......................... 10-2016-0124244

(51) Int. Cl.
*G06T 3/00* (2006.01)
*G06T 7/10* (2017.01)
*G06T 1/20* (2006.01)

(52) U.S. Cl.
CPC .............. *G06T 3/0018* (2013.01); *G06T 1/20* (2013.01); *G06T 7/10* (2017.01); *G06T 2207/20104* (2013.01); *G06T 2210/52* (2013.01)

(58) Field of Classification Search
CPC ....... G06T 1/20; G06T 3/0018; G06T 3/0093; G06T 5/006; G06T 7/10; G06T 2207/10016; G06T 2207/20104; G06T 2207/30232; G06T 2210/52
See application file for complete search history.

(56) References Cited

U.S. PATENT DOCUMENTS 7,058,237 B2    6/2006   Liu et al.
7,529,424 B2    5/2009   Ahiska
8,989,493 B1 *  3/2015   Huang .................... G06T 5/001
                                                      382/173

(Continued)

FOREIGN PATENT DOCUMENTS

EP      1376467     1/2004
JP      02127877    5/1990

(Continued)

OTHER PUBLICATIONS

Extended European Search Report dated Nov. 27, 2017, in European Patent Application No. 17193474.6.

(Continued)

*Primary Examiner* — Edward Park
(74) *Attorney, Agent, or Firm* — H.C. Park & Associates, PLC

(57) ABSTRACT

A method of processing a wide angle image including receiving an original image captured by a wide angle camera, receiving a user input selecting a plurality of regions of interest (ROIs) from the original image, generating in parallel a plurality of dewarping maps corresponding to the plurality of ROIs, and rendering in parallel a plurality of corrected images by correcting distortion of the plurality of ROIs based on the plurality of dewarping maps. Apparatus for carrying out the processing method also is disclosed.

13 Claims, 9 Drawing Sheets

(56) References Cited

U.S. PATENT DOCUMENTS

| | | | |
|---|---|---|---|
| 9,299,127 B2 | 3/2016 | Pekofsky et al. | |
| 2009/0027383 A1* | 1/2009 | Bakalash | G06F 9/5044 |
| | | | 345/419 |
| 2010/0119158 A1* | 5/2010 | Dalal | G06K 9/3275 |
| | | | 382/197 |
| 2014/0300687 A1* | 10/2014 | Gillard | G06T 15/20 |
| | | | 348/36 |
| 2014/0368606 A1* | 12/2014 | Bassi | G06T 3/0062 |
| | | | 348/36 |
| 2016/0119560 A1* | 4/2016 | Hayashi | H04N 5/23212 |
| | | | 348/241 |
| 2018/0089795 A1* | 3/2018 | Song | G06T 7/10 |
| 2018/0220156 A1* | 8/2018 | Kim | H04N 19/597 |

FOREIGN PATENT DOCUMENTS

| | | |
|---|---|---|
| KR | 10-2000-0000080 | 1/2000 |
| KR | 10-0926231 | 11/2009 |
| KR | 10-1058274 | 8/2011 |
| KR | 10-1230909 | 2/2013 |

OTHER PUBLICATIONS

Examination Report dated Nov. 12, 2019, issued in European Patent Application No. 17193494.6.

\* cited by examiner

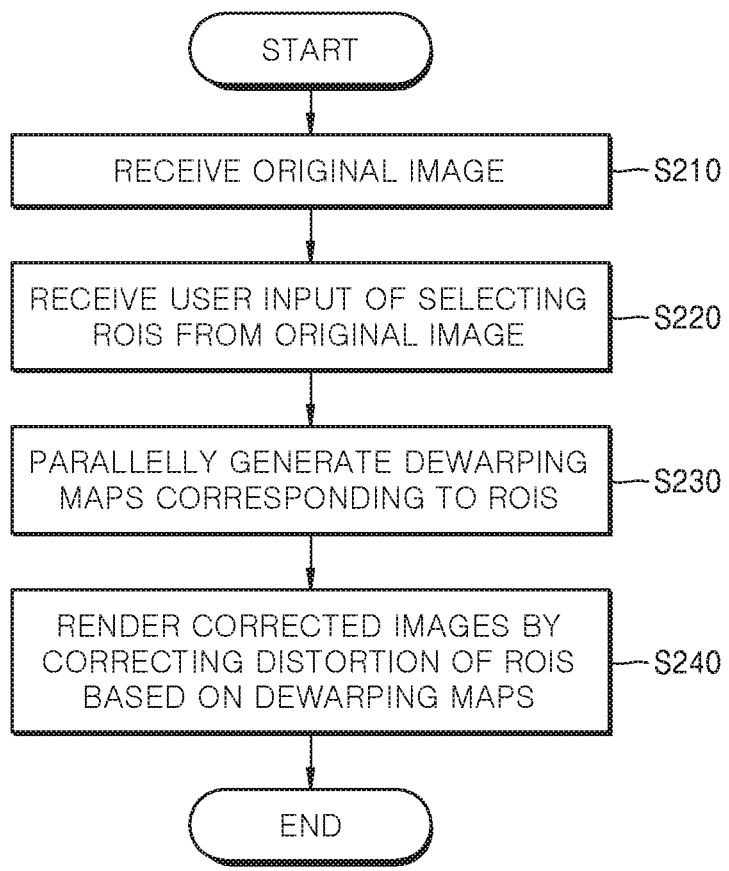

METHOD AND APPARATUS FOR PROCESSING WIDE ANGLE IMAGE

CROSS-REFERENCE TO RELATED APPLICATION

This application claims priority from and the benefit of Korean Patent Application No. 10-2016-0124244, filed on Sep. 27, 2016, which is hereby incorporated by reference for all purposes as if fully set forth herein.

BACKGROUND

Field

The invention relates generally to a method and apparatus for processing a wide angle image, and, more particularly to a method and apparatus for processing regions of interest in parallel and in response to user input.

Discussion of the Background

Fisheye cameras are used to monitor public places such as railroad stations, markets, intersections, or agencies, or public buildings such as libraries, law courts, or prisons. In addition, fisheye cameras are privately used to construct warning systems or monitor individuals who should be carefully watched. Thus, fisheye cameras can be suitable for both indoor and outdoor applications. However, images obtained from fisheye cameras often include portions that are distorted. And, of course, distorted, blurred or otherwise unclear images can occur with images obtained from virtually any type of camera used for virtually any purpose.

SUMMARY

Methods and apparatus constructed according to the principles of the invention provide an image processing technique with a user interface enabling ready selection and re-selection of regions of interest in the image.

One or more exemplary embodiments of the invention process portions of an image, such as a wide angle image, in parallel, which may obviate the need for re-processing certain regions of interest of the image and improve image processing performance. For example, one or more portions of a wide angle image may be omitted from processing and/or a different region of interest selected for processing without having to re-process unaffected regions of interest. Thus resources for image processing may be saved.

Methods and apparatus constructed according to the principles of the invention may also provide a dynamic user interface even though a service provider does not define all application program interfaces desired for the viewer application. Thus, an image processing technique, such as a wide angle image processing technique, suitable for a user's needs may be provided even when such an image processing technique is not fully available through any service provider.

Additional aspects will be set forth in part in the description which follows and, in part, will be apparent from the description, or may be learned by practice of the disclosed embodiments.

According to a first aspect of the invention, a method of processing a wide angle image includes receiving an original image captured by a wide angle camera, receiving a user input selecting a plurality of regions of interest (ROIs) from the original image, generating in parallel a plurality of dewarping maps corresponding to the plurality of ROIs, and rendering in parallel a plurality of corrected images by correcting distortion of the plurality of ROIs based on the plurality of dewarping maps.

The method may further include receiving a user input deleting a first ROI of the plurality of ROIs and deleting a first dewarping map corresponding to the first ROI.

The method may further include receiving a user input selecting a supplemental ROI, the supplemental ROI being in addition to the plurality of ROIs, generating a second dewarping map corresponding to the supplemental ROI, and rendering a second corrected image by correcting distortion of the supplemental ROI based on the second dewarping map.

The method may further include assigning priorities to the plurality of corrected images and deleting a first dewarping map corresponding to a first corrected image having a lowest priority among the plurality of corrected images in response to the user input selecting the supplemental ROI.

The method may further include receiving a user input replacing a first ROI that is one of the plurality of ROIs with a second ROI that is not one of the plurality of ROIs, deleting a first dewarping map corresponding to the first ROI and generating a second dewarping map corresponding to the second ROI, and rendering a second corrected image by correcting distortion of the second ROI based on the second dewarping map.

The wide angle camera may be a fisheye camera.

The step of generating in parallel a plurality of dewarping maps may include mapping, for at least one of the plurality of dewarping maps, position values of original pixels for the corresponding ROI with position values of corrected pixels constituting a corrected image.

The position values of the original pixels of the corresponding ROI may include pan angles, tilt angles, and zoom magnifications, and the position values of the corrected pixels constituting the corrected image may include X-coordinate values and Y-coordinate values.

The step of rendering in parallel the plurality of corrected images may include measuring a frame rate of the original image, determining whether the frame rate is lower than a reference frame rate, and, when the frame rate is lower than the reference frame rate, rendering the images except for at least a portion of at least one of the corrected images.

The method may further include the step of assigning priorities to the plurality of corrected images, wherein the at least one of the corrected images includes a first corrected image having a lowest priority among the plurality of corrected images.

According to as second aspect of the invention, an apparatus for processing a wide angle image includes a communication interface configured to receive an original image from a wide angle camera, a user interface configured to receive a user input selecting a plurality of ROIs from the original image, a processor configured to generate in parallel a plurality of dewarping maps corresponding to the plurality of ROIs and configured to render in parallel a plurality of corrected images by correcting distortion of the plurality of ROIs based on the plurality of dewarping maps, and a memory configured to store the plurality of dewarping maps.

The user interface may be configured to receive a user input deleting a first ROI of the plurality of ROIs, and the processor may be configured to delete from the memory a first dewarping map corresponding to the first ROI.

The user interface may be configured to receive a user input selecting a supplemental ROI, the supplemental ROI being in addition to the plurality of ROIs, the processor may be configured to generate a second dewarping map corresponding to the supplemental ROI and may be configured to render a second corrected image by correcting distortion of the supplemental ROI based on the second dewarping map, and the memory may be further configured to store the second dewarping map.

The processor may be configured to assign priorities to the plurality of corrected images and, in response to the user input selecting the supplemental ROI, may be configured to delete a first dewarping map corresponding to a first corrected image having a lowest priority among the plurality of corrected images from the memory.

The user interface may be configured to receive a user input replacing a first ROI that is one of the plurality of ROIs with a second ROI that is not one of the plurality of ROIs, and the processor may be configured to delete a first dewarping map corresponding to the first ROI from the memory, generate a second dewarping map corresponding to the second ROI, and render a second corrected image by correcting distortion of the second ROI based on the second dewarping map.

The processor may be configured to map, for at least one of the plurality of dewarping maps, position values of original pixels for the corresponding ROI with position values of corrected pixels constituting a corrected image, the position values of the original pixels of the corresponding ROI may include pan angles, tilt angles, and zoom magnifications, and the position values of the corrected pixels constituting the corrected image may include X-coordinate values and Y-coordinate values.

The processor may be configured to assign priorities to the plurality of corrected images, to measure a frame rate of the original image, to determine whether the frame rate is lower than a reference frame rate, and when the frame rate is lower than the reference frame fate, to render the images except for at least a portion of at least one corrected image of the plurality of corrected images.

According to a third aspect of the invention, a method for processing a wide angle image includes receiving, in a client terminal, an original image captured by a wide angle camera, receiving, in the client terminal, a user input selecting a plurality of ROIs from the original image, generating in parallel, by a server, a plurality of dewarping maps corresponding to the plurality of ROIs, and rendering in parallel, by the client terminal, a plurality of corrected images by correcting distortion of the plurality of ROIs based on the plurality of dewarping maps.

The method may further include receiving, in the client terminal, a user input deleting a first ROI of the plurality of ROIs, and deleting, by the server, a first dewarping map corresponding to the first ROI.

The method may further include receiving, in the client terminal, a user input selecting a supplemental ROI, the supplemental ROI being in addition to the plurality of ROIs, generating, by the server, a second dewarping map corresponding to the supplemental ROI, and rendering, by the client terminal, a second corrected image by correcting distortion of the supplemental ROI based on the second dewarping map.

BRIEF DESCRIPTION OF THE DRAWINGS

These and/or other aspects will become apparent and more readily appreciated from the following description of the embodiments, taken in conjunction with the accompanying drawings in which:

FIG. 2 is a flow diagram of an exemplary method of processing a wide angle image according to the invention;

DETAILED DESCRIPTION OF THE ILLUSTRATED EMBODIMENTS

Figure 1:
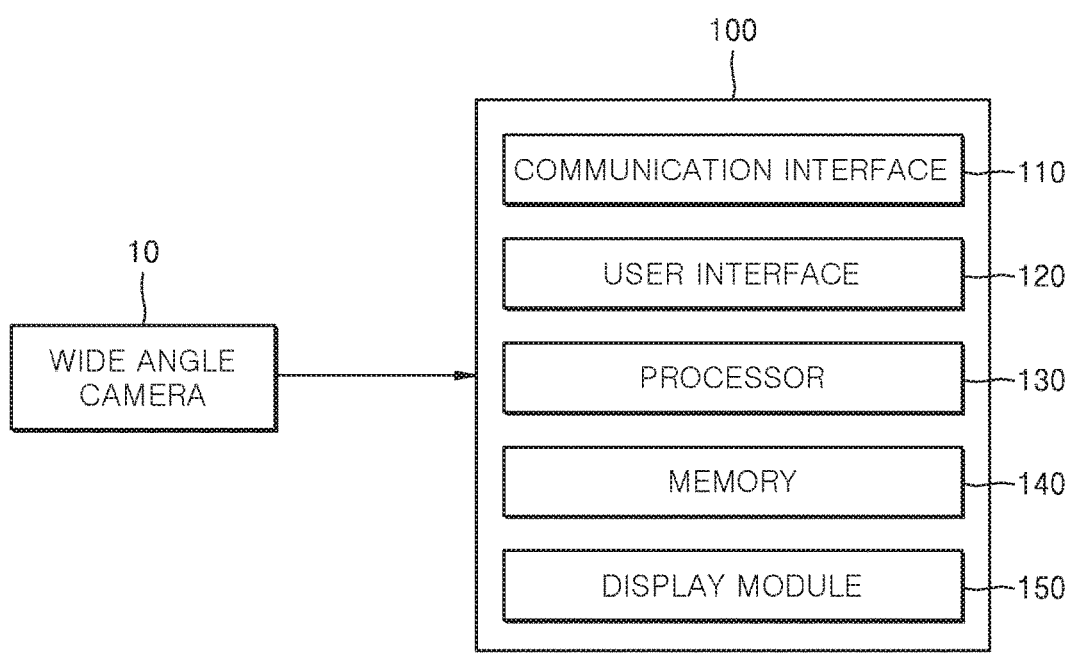
FIG. 1 is a schematic view of a wide angle image processing apparatus constructed according to the principles of the invention.
Figure 3A:
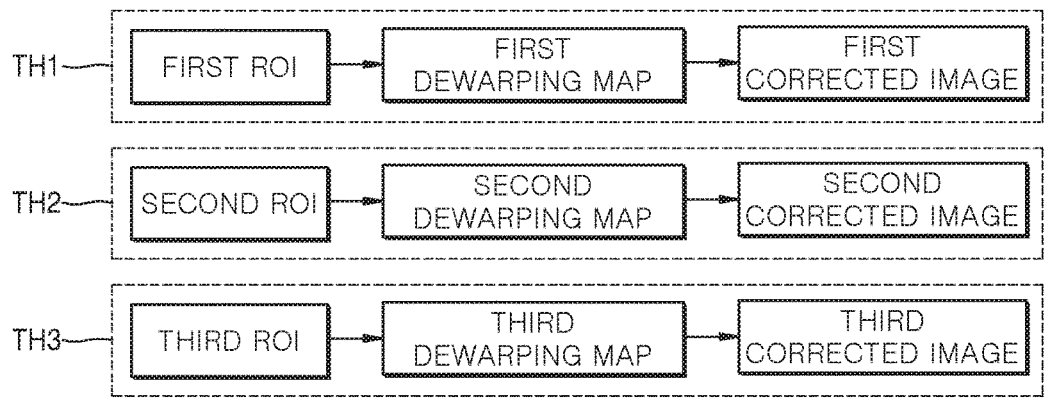
FIG. 3A is a schematic diagram of parallel processing threads graphically illustrating the exemplary method of processing a wide angle image according to the steps of FIG. 2.
Figure 3B:
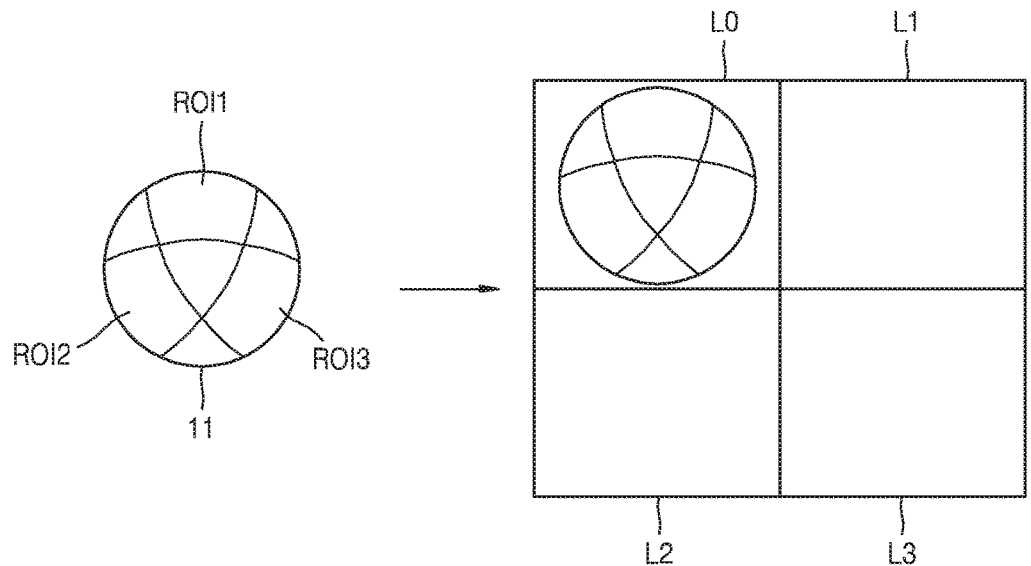
FIG. 3B is a schematic diagram graphically illustrating ROIs and image rendering according to the steps of FIG. 2.

Reference will now be made in detail to embodiments, examples of which are illustrated in the accompanying drawings, wherein like reference numerals refer to like elements throughout. In this regard, the various embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations may be omitted in order not to unnecessarily obscure subject matters of the embodiments.

It will be understood that although the terms "first" and "second" are used herein to describe various elements, these elements should not be limited by these terms. Terms are only used to distinguish one element from other elements.

In the following descriptions of embodiments, the technical terms are used only for explaining a specific embodiment while not limiting the inventive concepts. The meaning of "include" or "comprise" specifies a property, a fixed number, a step, a process, an element, a component, and a combination thereof but does not exclude other properties, fixed numbers, steps, processes, elements, components, and combinations thereof.

The inventive concepts of the disclosure may be embodied as functional blocks and various processing operations.

The functional blocks may be implemented with various hardware and/or software configurations executing specific functions. For example, embodiments of the disclosure may employ integrated circuit configurations such as a memory, a processing unit, a logic unit, a look-up table, and the like capable of executing various functions upon control by microprocessors or other control devices. In a similar manner to that in which the elements of the embodiments may be executed with software programming or software elements, the embodiments may be implemented with a scripting language or a programming language such as C, C++, Java, assembler, and the like, including various algorithms implemented by a combination of data structures, processes, routines, or other programming configurations. The functional aspects may be implemented by algorithms executed in one or more processors. Also, the embodiments may employ conversional arts to establish an electronic environment, process signals, and/or process data. Terms such as "mechanism," "element," "means," and "configuration" may be widely used and are not limited to mechanical and physical configurations. Such terms may have the meaning of a series of routines of software in association with a processor or the like.

Referring to FIG. 1, the wide angle image processing apparatus 100 processes original images received from a wide angle camera 10.

Original images of a surveillance zone are obtained by taking images of the surveillance zone using the wide angle camera 10. The wide angle camera 10 may take images of the surveillance zone in real time for surveillance or security. However, it should be apparent that other types of cameras may be used; and, it should also be apparent that other uses of the camera are contemplated within the scope of the description herein. A wide angle camera is used herein as one example of a camera that can be used within the scope of the invention; and, surveillance is used herein as an example of a use of the invention. Thus, the invention is not intended to be limited to wide angle cameras, nor to surveillance use of the camera. Rather, the inventive concepts may be employed in any image capture and processing system where distortion is an issue.

The wide angle camera 10 may be a fisheye camera having a field of view in the range of about 180° or greater. Original images captured by the wide angle camera 10 may be wide angle images having various types of distortion.

The wide angle image processing apparatus 100 outputs corrected images by correcting distortion of an original image. The wide angle image processing apparatus 100 may output corrected images in various modes. For example, the wide angle image processing apparatus 100 may be operated in a static view mode provided by a viewer application or a dynamic view mode according to a user's free selection.

The wide angle image processing apparatus 100 includes a communication interface 110, a user interface 120, a processor 130, a memory 140, and a display module 150.

The communication interface 110 receives original images captured by the wide angle camera 10.

For example, the communication interface 110 may communicate with the wide angle camera 10 using a wireless network, a wired network, a public network such as the Internet, a private network, a Global System for Mobile Communications (GSM) network, a General Packet Radio Service (GPRS) network, a local area network (LAN), a wide area network (WAN), a metropolitan area network (MAN), a cellular network, a public switched telephone network (PSTN), a personal area network (PAN), Bluetooth, Wi-Fi Direct, near field communication (NFC), ultra-wide band (UWB), a combination thereof, or any other network or means of communication currently known n the art or later developed.

To allow users to select desired regions of an original image using an input device, the user interface 120 may include the input device such as a keyboard, a mouse, a button, a dome switch, a jog wheel, a jog switch, a microphone, a pointer, a touch panel or other means of input currently known in the art or later developed.

The user interface 120 receives a user input selecting a plurality of regions of interest (ROIs) from an original image. For example, the user interface 120 may receive a user input touching a plurality of regions of an original image displayed on a touch screen. The ROIs may be polygonal regions. However, the ROIs may be defined and shaped in any desired manner.

The user interface 120 may receive a user input deleting one of the ROIs. For example, the user interface 120 may receive a user input by touching one of the ROIs and dragging the touched ROI to the outside of the original image.

The user interface 120 may receive a user input adding an ROI other than the ROIs included in the plurality of ROIs previously selected. For example, the user interface 120 may receive a user input touching a region other than the ROIs inside of the original image.

The user interface 120 may also, or alternatively, receive a user input changing an ROI. For example, the user interface 120 may receive a user input touching one of the ROIs and dragging the touched ROI to a region other than the ROIs.

As described above, a dynamic interface may be provided in addition to application programming interfaces (APIs) of the viewer application to allow users to freely select ROIs. Therefore, a wide angle image processing technique meeting a user's desires may be provided regardless of the API's provided.

The processor 130 generates in parallel a plurality of dewarping maps corresponding to the plurality of ROIs, and based on the plurality of dewarping maps, the processor 130 renders in parallel a plurality of corrected images by correcting distortion in the plurality of ROIs. The processor 130 may include a plurality of processors that are included in a computer or a plurality of computers. Each of the processors may generate a dewarping map corresponding to an ROI and may render a corrected image by correcting distortion in the ROI based on the dewarping map. In this case, the processors may operate in parallel to simultaneously generate dewarping maps, correct distortion of an image, and render corrected images.

The processor 130 may generate the dewarping maps respectively corresponding to the ROIs.

The dewarping maps may be lookup tables mapping position values of original pixels of the ROIs with position values of corrected pixels constituting the corrected images.

The original pixels may be pixels of the original image. The original pixels may have a distorted tetragonal shape. The position values of the original pixels may include pan angles, tilt angles, and zoom magnifications.

The corrected pixels may have a tetragonal shape. The position values of the corrected pixels may include X-coordinate values and Y-coordinate values.

The processor 130 may separately render the corrected images based on the dewarping maps. The processor 130 may assign priorities to the corrected images.

For example, the processor 130 may render the corrected images by recording pixel values of the original pixels in the corrected pixels based on the dewarping maps.

The processor 130 may delete one of the dewarping maps stored in the memory 140. For example, in response to a user input deleting one of the ROIs, the processor 130 may delete one of the dewarping maps corresponding to the deleted ROI.

Although rendering of a corrected image corresponding to the deleted dewarping map is stopped upon deletion, rendering of corrected images corresponding to dewarping maps that have not been deleted may continue. As described above, a plurality of dewarping maps may be generated in parallel and a plurality of corrected images may thus be rendered in parallel, thereby improving the performance of image processing such as wide angle image processing. At this time, the operation of a processor rendering a corrected image corresponding to the deleted dewarping map may be stopped, and the operations of processors rendering corrected images corresponding to dewarping maps that have not been deleted may be maintained.

In response to a user input adding an ROI other than the previously selected ROIs, the processor 130 may add to the memory 140 a dewarping map corresponding to the added ROI stored in the memory 140.

In response to the user input adding an ROI other than the previously selected ROIs, the processor 130 may delete from the memory 140 a dewarping map corresponding to a corrected image having the lowest priority.

That is, when a user adds an ROI, generation of a dewarping map and rendering of a corrected image are additionally performed for the added ROI while generation of dewarping maps and rendering of corrected images for the existing ROIs are maintained and/or continued.

In addition, when a user adds a new ROI, even though a dewarping map corresponding to an existing ROI may be deleted and rendering of a corrected image for the existing ROI thus be stopped, rendering of corrected images corresponding to dewarping maps that have not been deleted may continue.

As described above, although a new ROI is added or an existing ROI is deleted, all ROIs are not processed anew based on such a change, and thus resources for image processing such as wide angle image processing may be saved.

In response to a user input changing an ROI, the processor 130 may delete from the memory 140 a dewarping map corresponding to the ROI that is changed, and may the processor 130 add a dewarping map corresponding to the changed ROI to the memory 140.

As described above, although rendering of a corrected image corresponding to the deleted dewarping map may be stopped, rendering of corrected images corresponding to dewarping maps that have not been deleted is maintained and/or continued, and rendering of a corrected image corresponding to the newly added dewarping map is additionally performed. Therefore, although a new ROI is added or an existing ROI is deleted, all previously selected ROIs are not processed anew after such a change.

The processor 130 may measure the frame rate of the original image, and if the measured frame rate is lower than a reference frame rate, the processor 130 may perform rendering while skipping at least a portion of at least one of the corrected images.

The original image may be provided in the form of streaming data, and the processor 130 may measure the frame rate of the streaming data of the original image.

If the measured frame rate is lower than a reference frame rate, the processor 130 may determine that the load of the image processing is excessive.

Thus, the processor 130 may select at least one of the corrected images which are being rendered and may perform rendering while skipping at least some frames of the selected corrected image(s), so as to decrease the load of the image processing. To do this, the processor 130 may select a corrected image having the lowest priority from corrected images that are being rendered.

For example, if the reference frame rate is 16 frames per second (fps) and the frame rate of the original image is 15 fps, the processor 130 may select at least one corrected image from a plurality of corrected images and may perform rendering while skipping at least some frames of the selected corrected image.

The memory 140 separately stores a plurality of dewarping maps.

The dewarping maps may be stored in, or deleted from, the memory 140 under the control of the processor 130.

The display module 150 may display at least one of the original image and corrected images on a screen.

The display module 150 may display the original image on the screen. If the original image is displayed on the screen, a user may select a plurality of ROIs from the original image, delete the ROIs, add an ROI other than the ROIs, or change the ROIs.

The display module 150 may display corrected images on the screen. The display module 150 may output corrected images rendered by the processor 130 to the screen.

The display module 150 may simultaneously display the original image and at least one of the corrected images by dividing the screen. The display module 150 may provide a quad view by dividing the screen into four parts based on the APIs of the viewer application. The display module 150 may provide a penta-view by dividing the screen into five parts or any other number of parts based on a user's selection.

As described above, a dynamic user interface and a dynamic surveillance screen may be provided even though a service provider does not define all APIs desired for the viewer application. Therefore, a wide angle image processing technique suitable for a user's experience may be provided.

The wide angle image processing apparatus 100 may be implemented as a single physical apparatus or by organically combining a plurality of physical devices. Accordingly, some elements of the wide angle image processing apparatus 100 may be implemented as, or installed in, one physical device, and the other elements of the wide angle image processing apparatus 100 may be implemented as, or installed in, another physical device. One physical device may be implemented as a part of a client terminal, and another physical device may be implemented as a part of a server. In some embodiments, elements (or units) of the wide angle image processing apparatus 100 may be distributed in different physical devices, and the distributed elements may be organically combined to implement functions and/or operations defined herein.

Elements and operations of the wide angle image processing apparatus 100 implemented in a client terminal will now be described. The following descriptions of operations of the wide angle image processing apparatus 100 implemented in the client terminal may also be applied to operations of the wide angle image processing apparatus 100 implemented in a server.

The client terminal may be a personal computer or a mobile terminal. However, the client terminal is not limited to those forms.

Referring to FIGS. 1, 2, 3A and 3B, the communication interface 110 of the wide angle image processing apparatus 100 receives an original image 11 captured by the wide angle camera 10 (S210).

The display module 150 of the wide angle image processing apparatus 100 may display the original image 11 on the screen. The original image 11 may be a circular image in which central objects are relatively enlarged and peripheral objects are relatively shrunken.

Next, the user interface 120 of the wide angle image processing apparatus 100 receives a user input selecting a plurality of ROIs from the original image 11 (S220). For example, the user interface 120 may receive a user input selecting a first ROI 1, a second ROI 2, and a third ROI 3 from the original image 11.

Next, the processor 130 of the wide angle image processing apparatus 100 generates in parallel a plurality of dewarping maps corresponding to the plurality of ROIs (S230). For example, the processor 130 may generate a first dewarping map corresponding to the first ROI 1, a second dewarping map corresponding to the second ROI 2, and a third dewarping map corresponding to the third ROI 3.

The memory 140 stores the plurality of dewarping maps. For example, the memory 140 may separately store the first dewarping map, the second dewarping map, and the third dewarping map.

The processor 130 may simultaneously execute a first thread TH1 to process the first dewarping map, a second thread TH2 to process the second dewarping map, and a third thread TH3 to process the third dewarping map.

Next, the processor 130 renders a plurality of corrected images by correcting distortion of the plurality of ROIs based on the plurality of dewarping maps (S240). For example, the processor 130 may execute the first thread TH1 to correct distortion of the first ROI 1 based on the first dewarping map and thus render a first corrected image. At the same time, the processor 130 may execute the second thread TH2 to correct distortion of the second ROI 2 based on the second dewarping map and thus render a second corrected image. In addition, the processor 130 may concurrently execute the third thread TH3 to correct distortion of the third ROI 3 based on the third dewarping map and thus render a third corrected image.

The display module 150 of the wide angle image processing apparatus 100 may simultaneously output to the screen the original image 11 and the first to third corrected images rendered by the processor 130. For example, the display module 150 may provide a quad view including an original layer LO, a first layer L1, a second layer L2, and a third layer L3. The original image 11 may be displayed on the original layer LO, the first corrected image may be displayed on the first layer L1, the second corrected image may be displayed on the second layer L2, and the third corrected image may be displayed on the third layer L3.

An embodiment in which some elements of the wide angle image processing apparatus 100 are implemented in a client terminal and the other elements of the wide angle image processing apparatus 100 are implemented in a server will now be described. The same description as that disclosed above will not be repeated here or will be included here in a simplified form.

A communication interface 110 of the client terminal receives an original image 11 captured by the wide angle camera 10 (S210).

Next, a user interface 120 of the client terminal receives a user input selecting a plurality of ROIs from the original image 11 (S220). The client terminal may send a command indicating the selected plurality of ROIs to the server.

Next, a processor 130 of the server generates a plurality of dewarping maps corresponding to the plurality of ROIs (S230).

A memory 140 of the server stores the plurality of dewarping maps. The server may transmit information about the plurality of dewarping maps to the client terminal.

Next, a processor 130 of the client terminal renders a plurality of corrected images by correcting distortion of the plurality of ROIs based on the plurality of dewarping maps (S240).

A display module 150 of the client terminal may simultaneously output to the screen the original image 11 and the plurality of corrected images rendered by the processor 130.

According to the current embodiment, a physical device configured to receive an original image and render corrected images is separate from a physical device configured to manage dewarping maps corresponding to ROIs, and thus security may be improved.

Figure 4A:
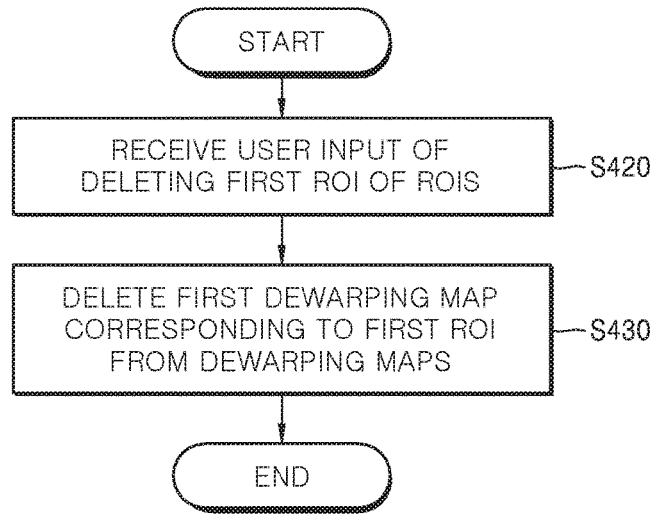
FIG. 4A is a flow diagram showing a step of deleting a region of interest (ROI) of a wide angle image according to an additional aspects of an exemplary processing method of the invention.
Figure 4B:
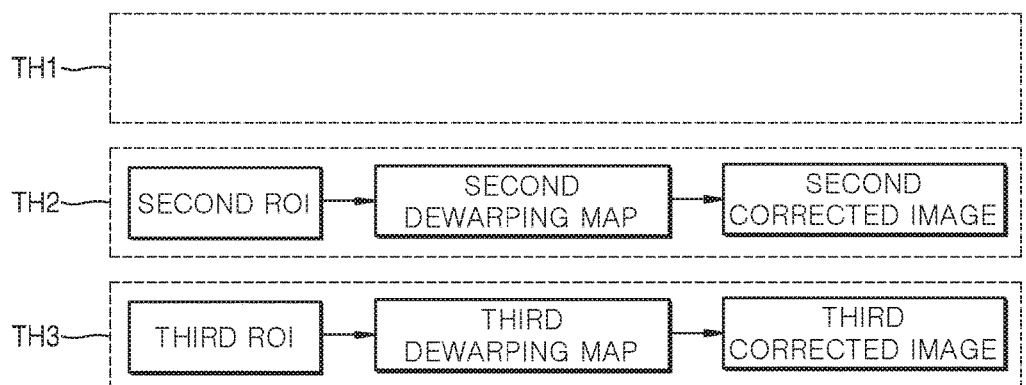
FIG. 4B is a schematic diagram of processing threads graphically illustrating the deleted region of ROI of the wide angle image according to the steps of FIG. 4A.

An exemplary processing method including the step of deleting a ROI of a wide angle image will now be explained with reference to FIGS. 4A and 4B. Referring to FIGS. 1, 2, 3, 4A, and 4B, the user interface 120 further receives a user input deleting the first ROI 1 of the plurality of ROIs (S420).

Next, the processor 130 deletes the first dewarping map corresponding the first ROI 1 from the plurality of dewarping maps stored in the memory 140 (S430).

As the processor 130 deletes the first dewarping map, execution of the first thread TH1 may be stopped. As execution of the first thread TH1 is stopped, rendering of the first corrected image may be stopped.

Although the processor 130 stops execution of the first thread TH1, the processor 130 may continue with execution of the second and third threads TH2 and TH3. As execution of the second and third threads TH2 and TH3 is maintained or continued, rendering of the second and third corrected images may be maintained or continued as well.

The display module 150 of the wide angle image processing apparatus 100 may simultaneously output the original image 11 and the second and third corrected images rendered by the processor 130 to the screen. For example, the display module 150 may provide a triple view including an original layer LO, a second layer L2, and a third layer L3.

An embodiment in which at least one or more elements of the wide angle image processing apparatus 100 are implemented in a client terminal and the other elements of the wide angle image processing apparatus 100 are implemented in a server will now be described.

A user interface 120 of the client terminal further receives a user input deleting the first ROI 1 of the plurality of ROIs (S420). The client terminal may send a command for deleting the first ROI 1 to the server.

Next, a processor 130 of the server deletes the first dewarping map corresponding to the first ROI 1 from a memory 140 of the server (S430). The server may transmit information about the plurality of dewarping maps from which the first dewarping map is deleted to the client terminal.

Next, a processor 130 of the client terminal may stop rendering of the first corrected image but may separately continue rendering of the second and third corrected images.

A display module 150 of the client terminal may simultaneously output the original image 11 and the second and third corrected images rendered by the processor 130 to the screen.

Figure 5A:
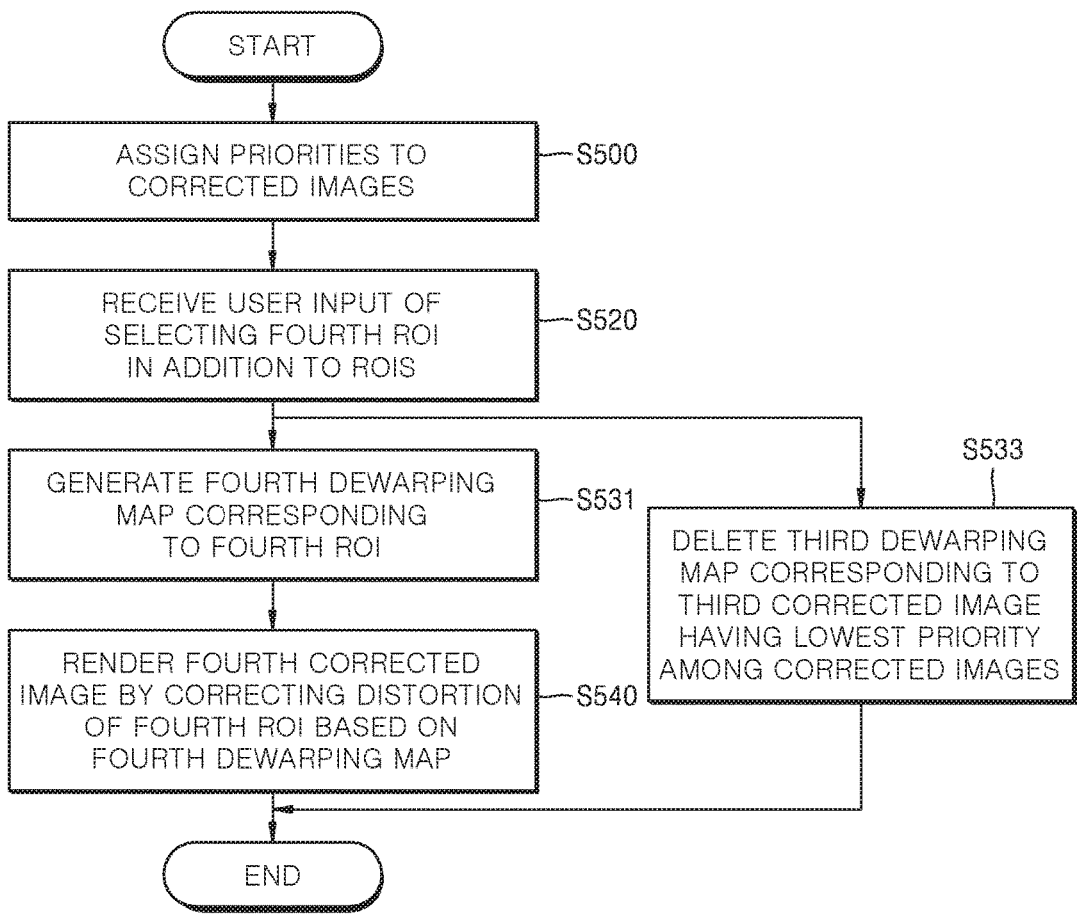
FIG. 5A is a flow diagram showing the steps of adding and optionally deleting a ROI of a wide angle image according to another exemplary processing method of the invention.
Figure 5B:
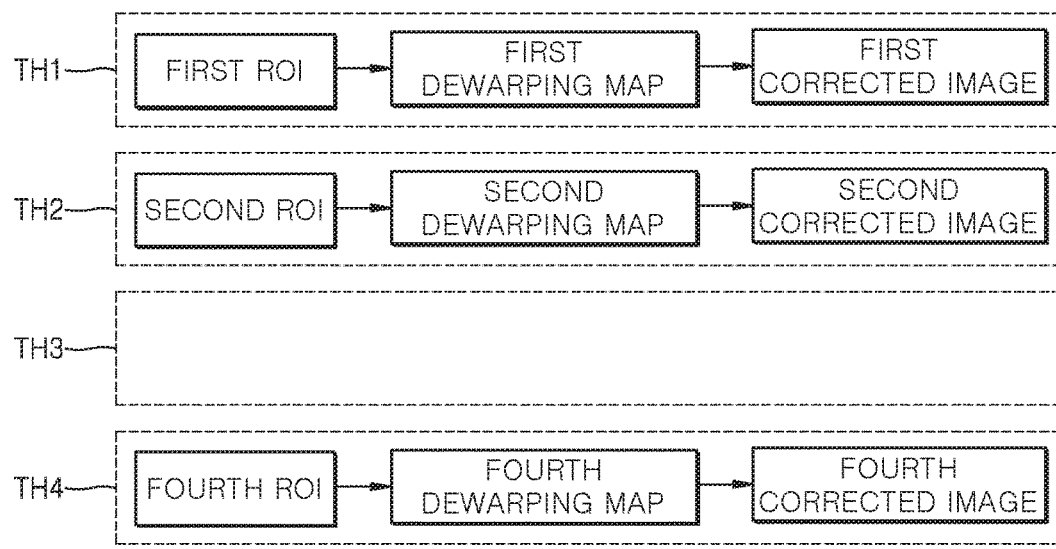
FIG. 5B is a schematic diagram of processing threads graphically illustrating the added and deleted ROIs of the wide angle image according to the steps of FIG. 5A.

An exemplary processing method including the steps of adding and optionally deleting a ROI of a wide angle image will now be described in relation to FIGS. 5A and 5B. In the following description, operations S520, S531, and S540 correspond to one embodiment, and operations S500, S520, S531, S540, and S533 correspond to another embodiment. Aspects of the other embodiment different from aspects of the one embodiment will now be described, and descriptions of overlapping aspects between the embodiments will be omitted or repeated in a simplified manner.

Referring to FIGS. 1, 2, 3A, 3B, 5A, and 5B, the user interface 120 further receives a user input selecting a fourth ROI in addition to the plurality of ROIs previously selected (S520). For example, the fourth ROI may be at least a portion of a region of the original image 11 other than the first ROI 1, the second ROI 2, and the third ROI 3.

Next, the processor 130 generates a fourth dewarping map corresponding to the fourth ROI (S531). The processor 130 may execute a fourth thread TH4 for processing the fourth dewarping map at the same time as doing so for the first thread TH1, the second thread TH2, and the third thread TH3.

The memory 140 may store the fourth dewarping map separately from the first dewarping map, the second dewarping map, and the third dewarping map.

Next, the processor 130 renders a fourth corrected image by correcting distortion of the fourth ROI based on the fourth dewarping map (S540). For example, the processor 130 may execute the fourth thread TH4 to correct distortion of the fourth ROI based on the fourth dewarping map and thus render a fourth corrected image.

The display module 150 may provide a penta-view including an original layer LO, a first layer L1, a second layer L2, a third layer L3, and a fourth layer. The original image 11 may be displayed on the original layer LO, the first corrected image may be displayed on the first layer L1, the second corrected image may be displayed on the second layer L2, the third corrected image may be displayed on the third layer L3, and the fourth corrected image may be displayed on the fourth layer.

An embodiment in which one or more elements of the wide angle image processing apparatus 100 are implemented in a client terminal and the other elements of the wide angle image processing apparatus 100 are implemented in a server will now be described.

A user interface 120 of the client terminal receives a user input selecting a fourth ROI in addition to the plurality of ROIs (S520). The client terminal may send a command to the server to add the fourth ROI.

Next, a processor 130 of the server generates a fourth dewarping map corresponding to the fourth ROI (S531). A memory 140 of the server stores the fourth dewarping map separately from the first dewarping map, the second dewarping map, and the third dewarping map. The server may transmit information about the plurality of dewarping maps, to which the fourth dewarping map is added, to the client terminal.

Next, a processor 130 of the client terminal renders a fourth corrected image by correcting distortion of the fourth ROI based on the fourth dewarping map (S540).

Then, a display module 150 of the client terminal may simultaneously output to the screen the original image 11 and the first to fourth corrected images rendered by the processor 130.

Thus, the processor(s) 130 may efficiently use resources by adding only one thread corresponding to an added ROI. This is an improvement over systems in which a thread corresponding to all ROIs is executed when a ROI is added.

According to the other embodiment, the processor 130 assigns priorities to the plurality of corrected images (S500). For example, the processor 130 may assign high to low priorities in the order of the first corrected image, the second corrected image, and the third corrected image.

Next, the user interface 120 receives a user input selecting a fourth ROI in addition to the plurality of ROIs already selected (S520).

Then, the processor 130 generates a fourth dewarping map corresponding to the fourth ROI (S531) and deletes, from the memory 140, the third dewarping map corresponding to the third corrected image having the lowest priority among the plurality of corrected images corresponding to previously selected ROIs (S533).

As the processor 130 deletes the third dewarping map, execution of the third thread TH3 may be stopped. As execution of the third thread TH3 is stopped, rendering of the third corrected image may be stopped.

Although the processor 130 stops execution of the third thread TH3, the processor 130 may maintain execution of the first thread TH1, the second thread TH2, and the fourth thread TH4. As execution of the first thread TH1, the second thread TH2, and the fourth thread TH4 is maintained, rendering of the first corrected image, the second corrected image, and the fourth corrected image may be separately maintained and/or continued without restarting the first thread TH1 or the second thread TH2.

The display module 150 may provide a quad view including an original layer LO, a first layer L1, a second layer L2, and a fourth layer. The original image 11 may be displayed on the original layer LO, the first corrected image may be displayed on the first layer L1, the second corrected image may be displayed on the second layer L2, and the fourth corrected image may be displayed on the fourth layer.

Some elements of the wide angle image processing apparatus 100 may be implemented in a client terminal and the other elements of the wide angle image processing apparatus 100 may be implemented in a server. At least one such embodiment will now be described.

A processor 130 of the server assigns priorities to the plurality of corrected images (S500).

A user interface 120 of the client terminal receives a user input selecting a fourth ROI in addition to the plurality of ROIs previously selected (S520). The client terminal may send a command to the server for adding the fourth ROI.

Next, a processor 130 of the server generates a fourth dewarping map corresponding to the fourth ROI (S531) and deletes the third dewarping map from the memory 140 (S533). The server may transmit, to the client terminal, information about the plurality of dewarping maps from which the third dewarping map is deleted and to which the fourth dewarping map is added.

Next, a processor 130 of the client terminal may stop rendering of the third corrected image and may add rendering of a fourth corrected image while separately continuing rendering of the first and second corrected images.

A display module 150 of the client terminal may simultaneously output the original image 11 and the first, second, and fourth corrected images rendered by the processor 130 to the screen.

The processor 130 may perform the operations S531 and S540 simultaneously with the operation S533. Thus, as described above, a plurality of threads may be executed in a parallel manner, and the performance of these various functions may thereby be improved.

In addition, since the processor 130 deletes an existing ROI having a low priority in response to the addition of a new ROI, the view mode of the display module 150 may be maintained intact by replacing the view of the deleted ROI with the view of the new ROI.

Figure 6A:
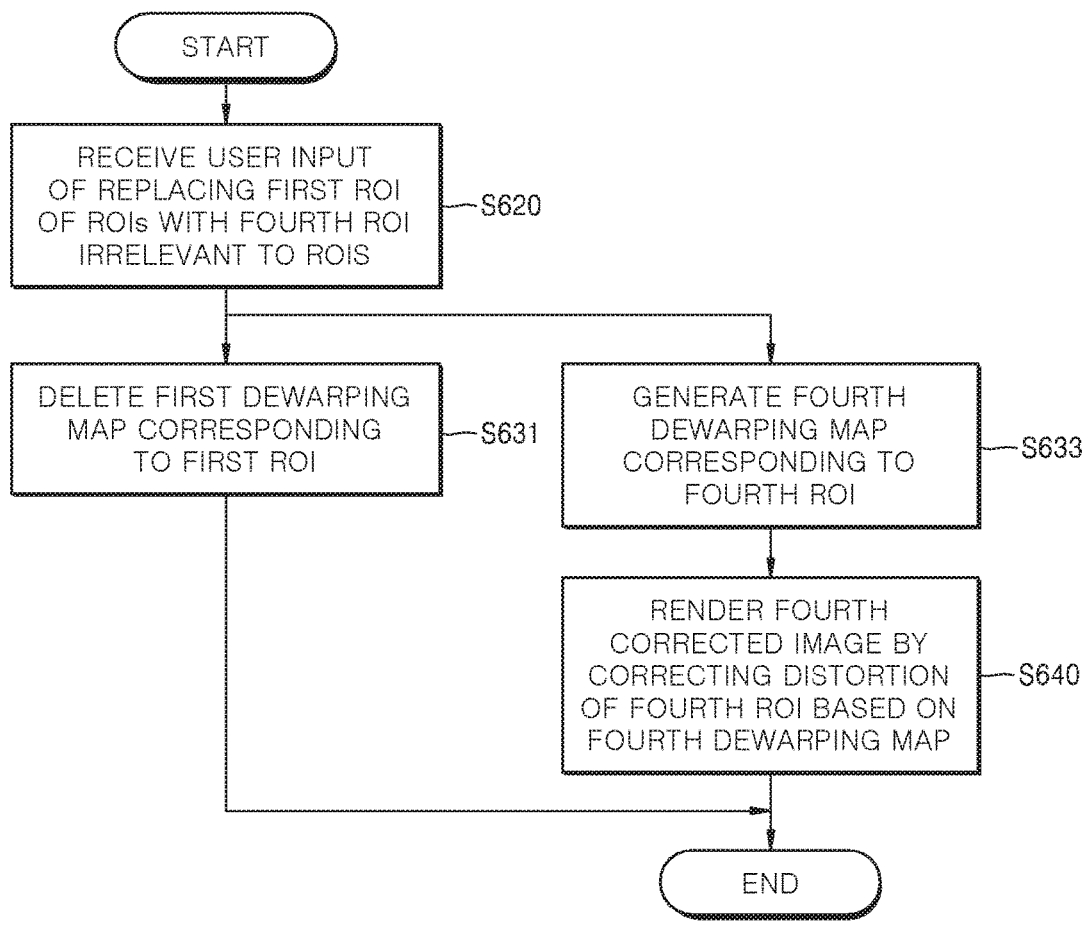
FIG. 6A is a flow diagram showing the steps of replacing a ROI of a wide angle image according to another exemplary processing method of the invention.
Figure 6B:
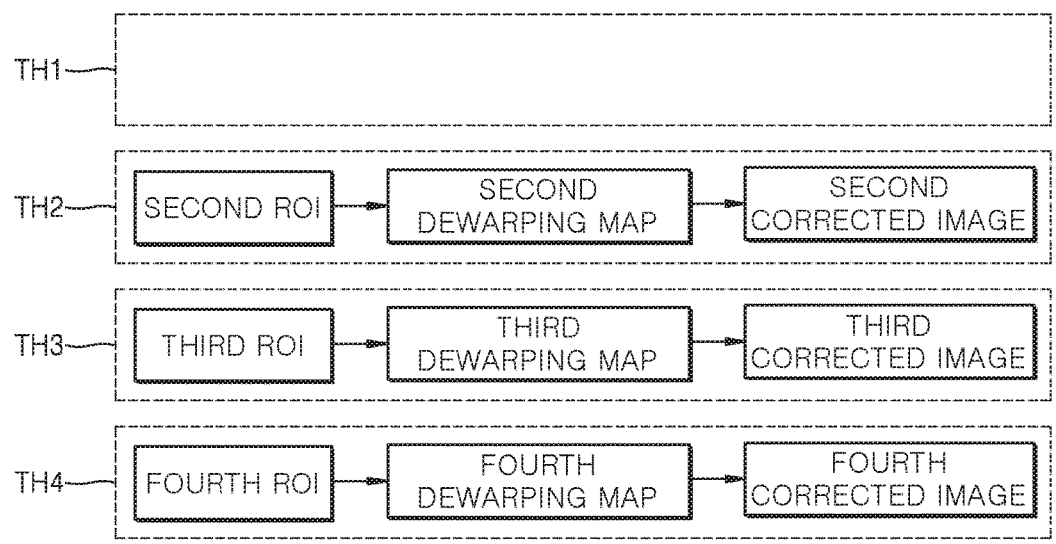
FIG. 6B is a schematic diagram of processing threads graphically illustrating the replaced ROI of the wide angle image according to the steps of FIG. 6A.

An exemplary image processing method for replacing a ROI will now be described with reference to FIGS. 6A and 6B. Referring to FIGS. 1, 2, 3A, 3B, 6A, and 6B, the user interface 120 receives a user input replacing the first ROI 1 of the plurality of ROIs with a fourth ROI not among the previously selected plurality of ROIs (S620). An ROI not among the previously selected ROIs is referred to herein as being irrelevant to the ROIs.

The processor 130 deletes the first dewarping map corresponding to the first ROI 1 from the memory 140 in response to the user input changing an ROI (S631).

As the processor 130 deletes the first dewarping map, execution of the first thread TH1 may be stopped. As the execution of the first thread TH1 is stopped, rendering of the first corrected image may be stopped.

In response to the user input changing an ROI, the processor 130 generates a fourth dewarping map corresponding to the fourth ROI (S633) and renders a fourth corrected image obtained by correcting distortion of the fourth ROI based on the fourth dewarping map (S640).

The processor 130 may execute a fourth thread TH4 for processing the fourth dewarping map at the same time as the second thread TH2 and the third thread TH3.

The memory 140 may store the fourth dewarping map separately from the second dewarping map and the third dewarping map.

The display module 150 of the wide angle image processing apparatus 100 may simultaneously output to the screen the original image 11 and the second to fourth corrected images rendered by the processor 130. For example, the display module 150 may provide a quad view including an original layer LO, a first layer L1, a second layer L2, and a third layer L3. The original image 11 may be displayed on the original layer LO, the fourth corrected image may be displayed on the first layer L1, the second corrected image may be displayed on the second layer L2, and the third corrected image may be displayed on the third layer L3.

Some elements of the wide angle image processing apparatus 100 may be implemented in a client terminal and the other elements of the wide angle image processing apparatus 100 may be implemented in a server. At least one such embodiment will now be described.

A user interface 120 of the client terminal receives a user input replacing the first ROI 1 of the plurality of ROIs with a fourth ROI irrelevant to the plurality of ROIs (S620). The client terminal may send a command for replacing the first ROI 1 with the fourth ROI to the server.

Next, a processor 130 of the server deletes the first dewarping map corresponding to the first ROI 1 from a memory 140 of the server (S631), and generates a fourth dewarping map corresponding to the fourth ROI (S633). The server may transmit information about the plurality of dewarping maps, from which the first dewarping map is deleted and to which the fourth dewarping map is added, to the client terminal.

Next, a processor 130 of the client terminal may stop rendering of the first corrected image and may add rendering of the fourth corrected image while continuing rendering of the second and third corrected images.

Figure 7:
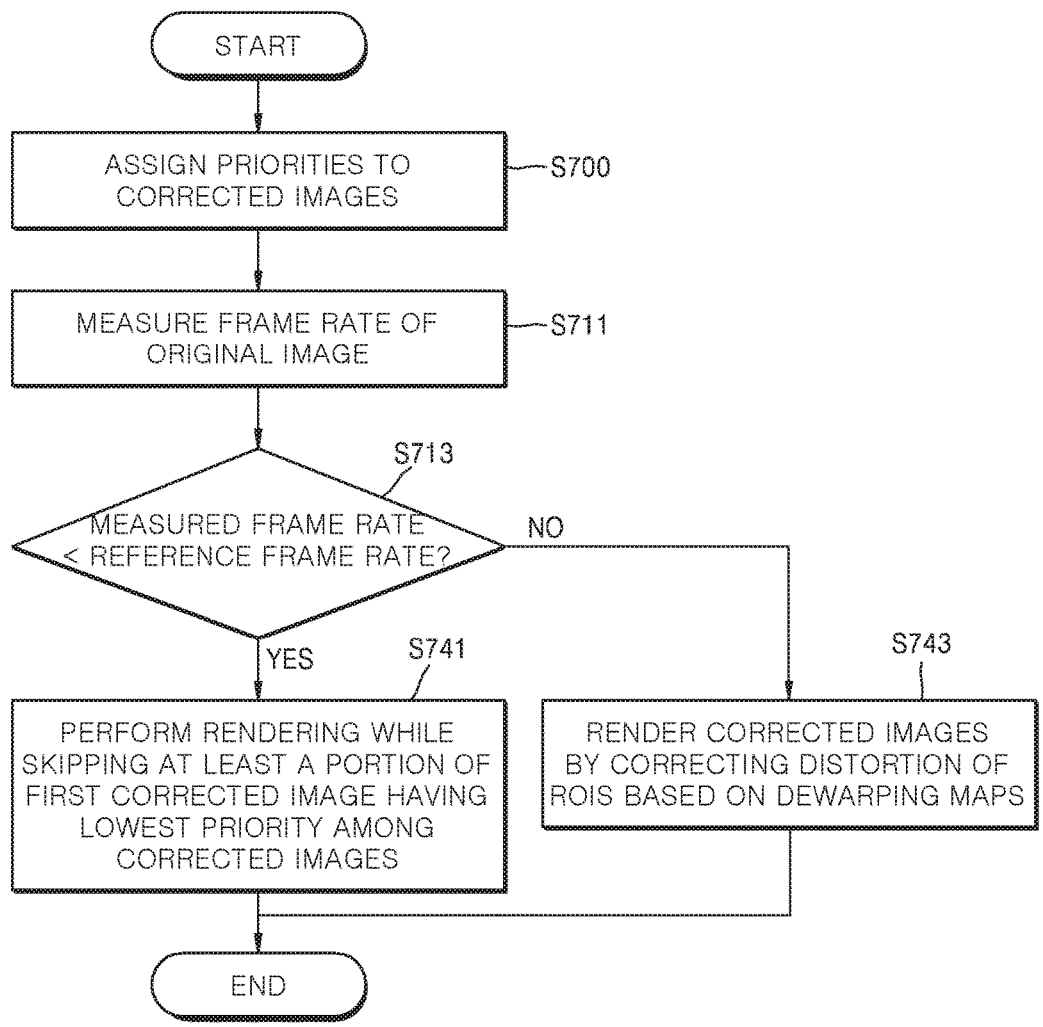
FIG. 7 is a flow diagram illustrating yet another exemplary method of processing a wide angle image to render corrected images according to the invention.

Referring to FIGS. 1, 2, and 7, an exemplary method of processing a wide angle image to render corrected images will now be described. The processor 130 assigns priorities to a plurality of corrected images (S700). For example, the processor 130 may assign low to high priorities in the order of a first corrected image, a second corrected image, and a third corrected image.

The processor 130 measures the frame rate of an original image (S711).

Next, the processor 130 determines whether the measured frame rate is lower than a reference frame rate (S713). For example, the reference frame rate may be 16 fps.

If the measured frame rate is lower than the reference frame rate, the processor 130 may perform rendering while skipping at least a portion of the corrected image having the lowest priority among the plurality of corrected images (S741). For example, if the measured frame rate of the original image is 15 fps, the processor 130 may perform rendering while skipping at least some frames of the first corrected image.

The skipped frames of the first corrected image may be frames in which an event does not happen. However, it should be apparent that the lowest priority can occur for other reasons. For example, the skipped frames of the first corrected image may be frames in which only a background is photographed without any moving object.

If the measured frame rate is higher than the reference frame rate, the processor 130 renders a plurality of corrected images obtained by correcting distortion of a plurality of ROIs based on a plurality of dewarping maps (S743). That is, the processor 130 may render the first corrected image, the second corrected image, and the third corrected image in parallel.

As described above, a plurality of corrected images obtained from one original image may be processed in parallel, and the performance of wide angle or other image processing of a distorted or otherwise imperfect image may be improved.

In addition, although a new ROI may be added or an existing ROI may be deleted, all ROIs are not processed anew in response to such a change, and thus resources for wide angle image processing may be saved.

In addition, a dynamic user interface and a display such as a surveillance screen may be provided even though a service provider does not define all APIs desired for the viewer application.

Therefore, an image processing system and method that meets a user's desires may be provided.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concepts as defined by the following claims.

What is claimed is:

1. A method of processing a wide angle image, the method comprising:
   receiving an original image captured by a wide angle camera;
   receiving a user input selecting a plurality of regions of interest (ROIs) from the original image;
   generating in parallel a plurality of dewarping maps corresponding to the plurality of ROIs;
   rendering in parallel a plurality of corrected images by correcting distortion of the plurality of ROIs based on the plurality of dewarping maps;
   receiving a user input selecting a supplemental ROI, the supplemental ROI being in addition to the plurality of ROIs;
   generating a second dewarping map corresponding to the supplemental ROI; and
   rendering a second corrected image by correcting distortion of the supplemental ROI based on the second dewarping map;
   assigning priorities to the plurality of corrected images; and
   deleting a first dewarping map corresponding to a first corrected image having a lowest priority among the plurality of corrected images in response to the user input selecting the supplemental ROI.

2. The method of claim 1, further comprising:
   receiving a user input deleting a first ROI of the plurality of ROIs; and
   deleting a first dewarping map corresponding to the first ROI.

3. The method of claim 1, further comprising:
   receiving a user input replacing a first ROI that is one of the plurality of ROIs with a second ROI that is not one of the plurality of ROIs;
   deleting a first dewarping map corresponding to the first ROI and generating a second dewarping map corresponding to the second ROI; and
   rendering a second corrected image by correcting distortion of the second ROI based on the second dewarping map.

4. The method of claim 1, wherein the wide angle camera is a fisheye camera.

5. The method of claim 1, wherein the step of generating in parallel a plurality of dewarping maps includes mapping, for at least one of the plurality of dewarping maps, position values of original pixels for the corresponding ROI with position values of corrected pixels constituting a corrected image.

6. The method of claim 5, wherein the position values of the original pixels of the corresponding ROI comprise pan angles, tilt angles, and zoom magnifications, and
   the position values of the corrected pixels constituting the corrected image comprise X-coordinate values and Y-coordinate values.

7. The method of claim 1, wherein the step of rendering in parallel the plurality of corrected images comprises:
   measuring a frame rate of the original image;
   determining whether the frame rate is lower than a reference frame rate; and
   when the frame rate is lower than the reference frame rate, rendering the images except for at least a portion of at least one of the corrected images.

8. The method of claim 7, further comprising the step of assigning priorities to the plurality of corrected images, wherein the at least one of the corrected images comprises a first corrected image having a lowest priority among the plurality of corrected images.

9. An apparatus for processing a wide angle image, the apparatus comprising:
   a communication interface configured to receive an original image from a wide angle camera;
   a user interface configured to receive a user input selecting a plurality of ROIs from the original image;
   a processor configured to generate in parallel a plurality of dewarping maps corresponding to the plurality of ROIs and configured to render in parallel a plurality of corrected images by correcting distortion of the plurality of ROIs based on the plurality of dewarping maps; and
   a memory configured to store the plurality of dewarping maps,
   wherein:
   the user interface is configured to receive a user input selecting a supplemental ROI, the supplemental ROI being in addition to the plurality of ROIs;
   the processor is configured to generate a second dewarping map corresponding to the supplemental ROI and configured to render a second corrected image by correcting distortion of the supplemental ROI based on the second dewarping map;
   the memory is further configured to store the second dewarping map; and
   the processor is configured to assign priorities to the plurality of corrected images and, in response to the user input selecting the supplemental ROI, to delete a first dewarping map corresponding to a first corrected image having a lowest priority among the plurality of corrected images from the memory.

10. The apparatus of claim 9, wherein the user interface is configured to receive a user input deleting a first ROI of the plurality of ROIs, and
    the processor is configured to delete from the memory a first dewarping map corresponding to the first ROI.

11. The apparatus of claim 9, wherein the user interface is configured to receive a user input replacing a first ROI that is one of the plurality of ROIs with a second ROI that is not one of the plurality of ROIs, and
    the processor is configured to delete a first dewarping map corresponding to the first ROI from the memory, generate a second dewarping map corresponding to the second ROI, and render a second corrected image by correcting distortion of the second ROI based on the second dewarping map.

12. The apparatus of claim 9, wherein the processor is configured to map, for at least one of the plurality of dewarping maps, position values of original pixels for the corresponding ROI with position values of corrected pixels constituting a corrected image,
    the position values of the original pixels of the corresponding ROI comprise pan angles, tilt angles, and zoom magnifications, and
    the position values of the corrected pixels constituting the corrected image comprise X-coordinate values and Y-coordinate values.

13. The apparatus of claim 9, wherein the processor is configured to assign priorities to the plurality of corrected images, to measure a frame rate of the original image, to determine whether the frame rate is lower than a reference frame rate, and when the frame rate is lower than the reference frame rate, to render the images except for at least a portion of a first corrected image having a lowest priority among the plurality of corrected images.

* * * * *